United States Patent Office 2,938,043
Patented May 24, 1960

2,938,043

PREPARATION OF PREGNAN-11 ALPHA, 17 ALPHA, 21 TRIOL 3,20 DIONES AND THE CORRESPONDING 4-PREGNENES

Eugene P. Oliveto, Bloomfield, and Emanuel B. Hershberg, West Orange, N.J., assignors to Schering Corporation, Bloomfield, N.J., a corporation of New Jersey No Drawing. Filed Aug. 15, 1952, Ser. No. 304,661

6 Claims. (Cl. 260—397.45)

The present invention relates to a new group of 20-keto steroid compounds of the 10,13-dimethyl series which are themselves therapeutically active steroids, or can serve as intermediates for the manufacture of therapeutically useful compounds.

More particularly this invention relates to a new group of 10,13-dimethyl polyketocyclopentanopolyhydrophenanthrenes having an 11-α-hydroxyl function and having the general formula

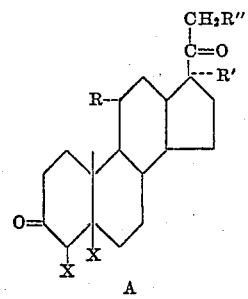

wherein R is hydroxyl or acyloxy, R' is hydrogen or hydroxyl, R" is hydrogen, hydroxyl or acyloxy, at least one of R' and R" being an oxygenated function, and X, X represent either H, H or a $\Delta^{4,5}$ bond, the dotted line indicating the α-configuration.

It is generally known in the art that catalytic reduction of a 3- or a 17-keto steroid gives the β-configuration, while a sodium in alcohol reduction results in mixtures composed chiefly of the β-configuration. It is also known that catalytic reduction of an 11-keto function results only in the β-configuration.

It is accordingly one of the objects of the invention to provide a procedure for the preparation of new and useful 11α-hydroxylated steroids containing at C-17 the side chain characteristic of many of the active cortical hormones, and in good yield.

In accordance with the invention, compounds of general formula A are prepared from the appropriately substituted 11-keto steroids. As an illustration, by reacting the 20-ethylene glycol ketal of pregnan-3α-17α-diol-11,20-dione (I) (see co-pending application of Oliveto, Gould and Clayton, filed June 4, 1952, Serial No. 291,781, now abandoned) with sodium in propanol, there is obtained the 11-α hydroxy analogue (Ia), which when subjected to acid hydrolysis yields the keto-triol (II), obtained as a monohydrate. In order to introduce an oxygen function at C-21, II is first treated in a known manner with bromine resulting in the 21-brom steroid (III). We prefer to first remove the water of hydration before bromination. Acetoxylation of III followed by acetylation yields IV. Alternatively, the tetrol (IV) can be prepared by acetylation of II yielding V which is transformed to IV by bromination followed by acetoxylation. The following equations demonstrate the above series of transformations:

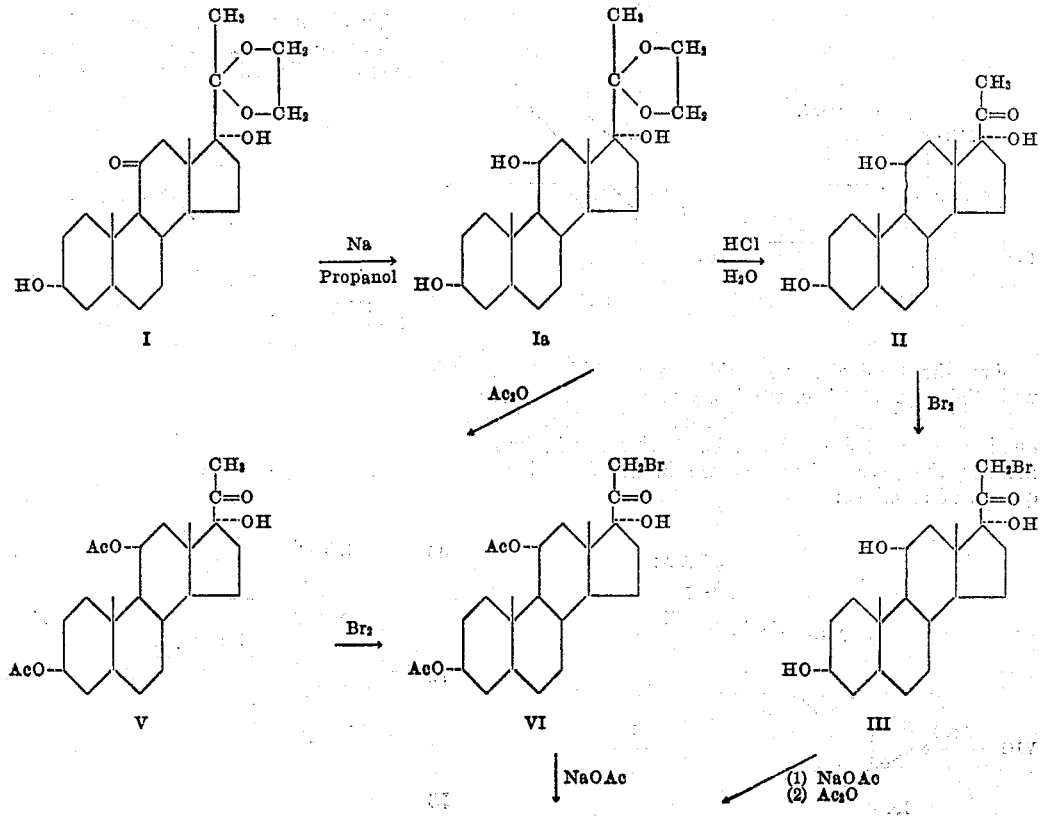

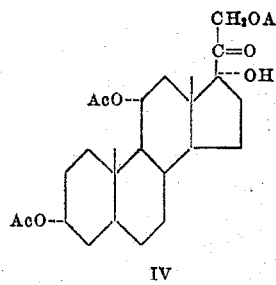

IV

To convert the 3-hydroxyl to a ketone, various methods can be employed. For example, acetoxylation of III with sodium acetate in acetone forms the 21-acetate (VII). Selective oxidation of VII with N-bromacetamide (NBA) (as described for example, in the copending application of Herzog and Hershberg, filed September 9, 1952, Serial No. 308,708, now abandoned) yields the 3,20-dione (VIII). Alternatively, III can first be selectively oxidized to the diol-dione-bromine (XIV) which is easily converted to the 21-acetate in known manner. The following equations illustrate these chemical conversions:

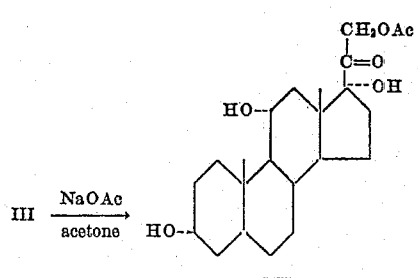

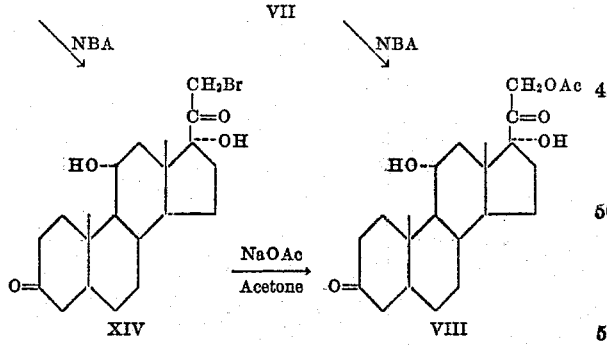

Since the 11α-hydroxy steroids are crystallizable only with difficulty, VIII is conveniently acetylated with acetic anhydride to form the crystalline diacetate (IX). Introduction of the Δ$^{4,5}$ bond can be carried out in known manner, the process being shown in the following sequence of reactions:

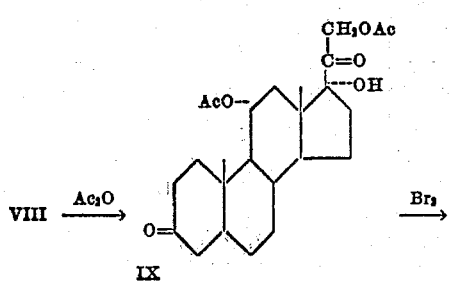

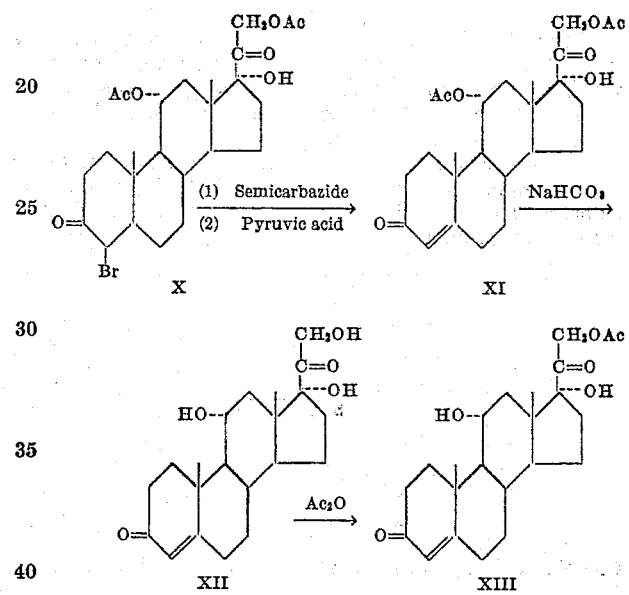

To obtain analogous compounds having no functional substituent at C-21, compound II can be treated in the manner indicated by the following reactions:

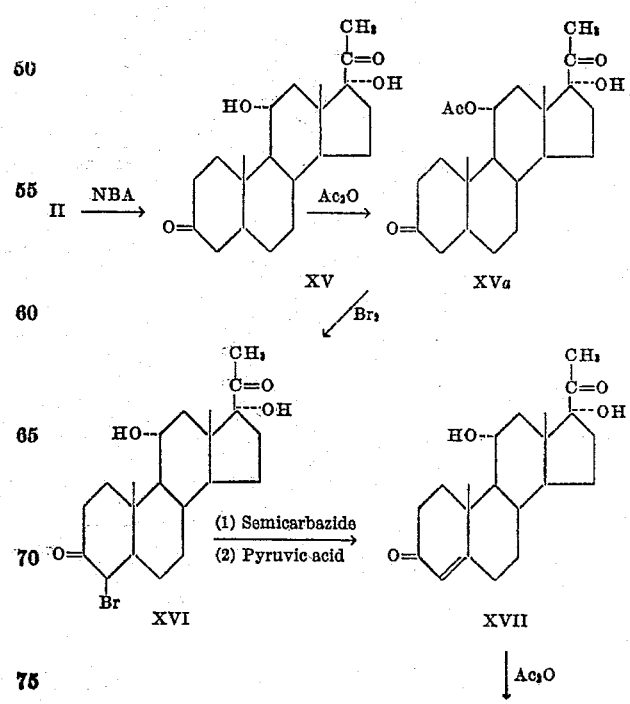

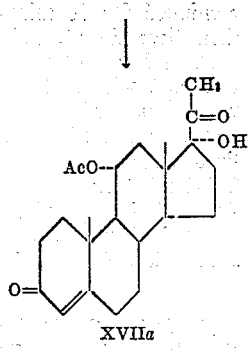

Another approach to 11-α hydroxy steroids bearing the cortical side chain which, as is known, has the β-configuration is accomplished by starting with the 3,20-bisethylene glycol ketal of pregnan-21-ol-3,11-20-trione (XVIII). The following equations depict the transformations resulting in Δ⁴-pregnen-11-α, 21-diol-3,20-dione-21-acetate (XXIII).

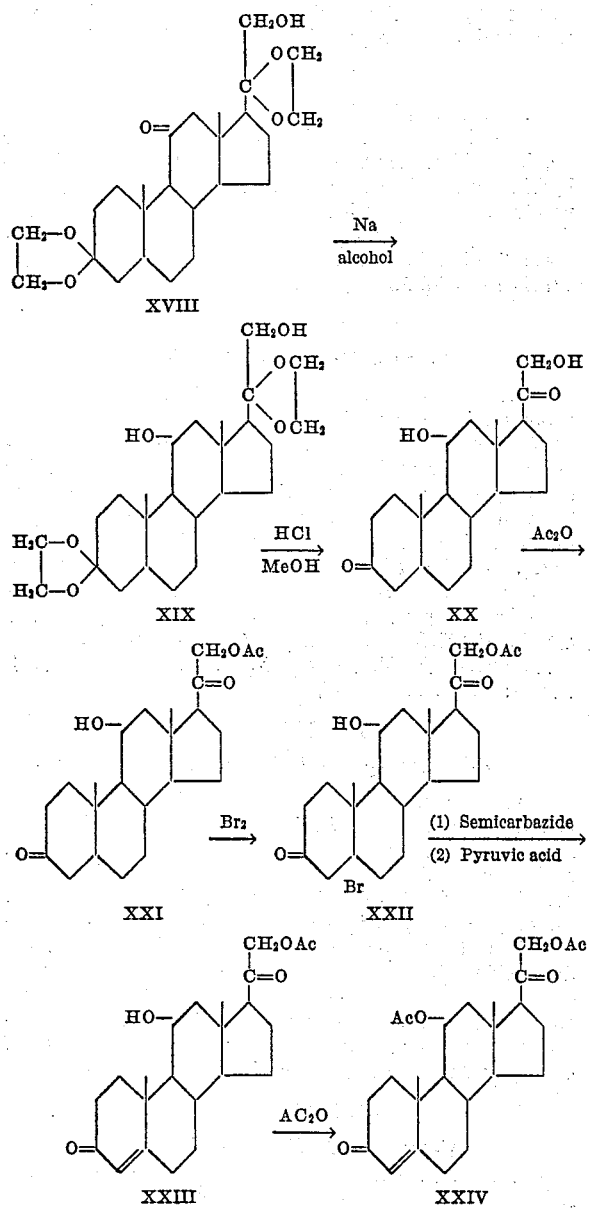

The following examples present satisfactory procedures for carrying out the invention, but it is to be understood that they are presented for purposes of illustration only and not as indicating the scope of the invention.

EXAMPLE 1

*20-ethylene glycol ketal of pregnan-3α,11α,17α-triol-20-one*

A solution of 45 g. of the 20-ethylene glycol ketal of pregnan-3α,17α-diol-11,20-dione (co-pending application of Oliveto et al., filed June 4, 1952, Serial No. 291,781) in 2 liters of propanol was heated to reflux, and 200 g. of sodium was then added over a period of ½ hour. Refluxing was continued for 1 hour, 500 ml. of methanol was added, and the heating continued another ½ hour. The solution was concentrated to about half the volume and water was added to incipient crystallization. Upon cooling, there were obtained 44 g. (97%) of the trihydroxyketal, M.P. 210–212° C. An analytical sample, crystallized from aqueous methanol, had a M.P. of 213.2–214.0°, $[\alpha]_D$ −13.3° (acetone).

*Analysis.*—Calc'd for $C_{23}H_{38}O_5$: C, 70.01; H, 9.71. Found: C, 69.70; H, 9.74.

EXAMPLE 2

*Pregnan-3α,11α,17α-triol-20-one*

To a solution of 20 g. of the ketal obtained in Example 1 in 100 ml. of acetone and 50 ml. of water was added 1 ml. of concentrated hydrochloric acid. The solution was refluxed ½ hour and water was added to induce crystallization. After cooling and filtering there was obtained 17.5 g. (94%) of the trihydroxyketone crystallizing as the monohydrate with no definite melting point. The analytical sample was crystallized once more from aqueous acetone, $[\alpha]_D$ +25.8° (acetone).

*Analysis.*—Calc'd for $C_{21}H_{34}O_4 \cdot H_2O$: C, 68.44; H, 9.85. Found: C, 68.14; H, 10.07.

EXAMPLE 3

*Pregnan-3α,11α,17α-triol-20-one 3,11-diacetate*

Acetylation of the trihydroxyketone (obtained in Example 2) with acetic anhydride in pyridine yielded the 3α,11α-diacetate, crystallizable from aqueous acetone, M.P. 190.2–191.4°, $[\alpha]_D$ +21.7° (acetone).

EXAMPLE 4

*21-bromopregnan-3α,11α,17α-triol-20-one*

To remove the water of hydration, a solution of 1.0 g. of the trihydroxyketone of Example 2, in 50 ml. of chloroform was concentrated to a residue. The residue was dissolved in 25 ml. of C.P. chloroform, a saturated solution of hydrogen bromide in 10 ml. of C.P. chloroform was added, and the mixture cooled to −10° C. At this temperature the solution was brominated with 480 mg. of bromine in 10 ml. of C.P. chloroform over a period of five minutes. After allowing the reaction mixture to warm to room temperature, the chloroform was removed under reduced pressure, the residue triturated with acetone, and the precipitated solid removed by filtration. A sample crystallized from aqueous acetone as a hydrate, M.P. 172–173° dec., $[\alpha]_D$ +65.8° (acetone).

*Analysis.*—Calc'd for $C_{21}H_{33}O_4$ Br. $H_2O$; Br, 17.85. Found: Br. 17.70.

EXAMPLE 5

*Pregnan-3α,11α,17α,21-tetrol-20-one 3,11,21-triacetate*

(a) A mixture of 1.0 g. of the 21-bromide of Example 4 in 50 ml. of acetone and 3 g. of sodium acetate was refluxed for 10 hours. Water and chloroform were added, the organic layer was washed once with water, and dried over sodium sulfate. Removal of the solvent gave an oil, which was then acetylated with acetic anhydride in pyridine in the usual manner to give the triacetate. An analytical sample crystallized from methanol had a M.P. of 229–234°, $[\alpha]_D$ +59° (dioxane).

(b) As an alternative procedure, a solution of 2.0 g. of pregnan-3α,11α,17α-triol-20-one 3,11-diacetate (Example 3) in 25 ml. of C.P. chloroform containing 5 ml.

of C.P. chloroform saturated with hydrogen bromide was cooled to $-10°$ and brominated with a solution of 760 mg. of bromine in 25 ml. of C.P. chloroform. After removal of the solvent, the residue was acetoxylated for 10 hours by refluxing with 75 ml. of acetone and 6 g. of sodium acetate. The triacetate was isolated as described in part (a) of this example and crystallized from methanol, to give 1.7 g., M.P. 226–230°.

EXAMPLE 6

21-bromopregnan-11α,17α,diol-3,20-dione

One gram of the 21-bromide of Example 4 was dissolved in 100 ml. of acetone and 10 ml. of water and cooled to 3–5°. One-half gram of N-bromoacetamide was added and the solution maintained at 3–5° for 1½ hours. The excess oxidizing agent was destroyed by the addition of one gram of sodium sulfite, followed by a large excess of water. After extracting the mixture with chloroform, the chloroform layer was washed with water, dried over sodium sulfate and concentrated to a residue under reduced pressure. Crystallization of the residue from acetone-hexane gave 0.41 g. of 21-bromopregnan-11α,17α-diol-3,20-dione, M.P. 200–205° dec.

EXAMPLE 7

Pregnan-11α,17α,21-triol-3,20-dione 11,21-diacetate (a) One gram of the 21-bromide of Example 4 was acetoxylated as described in Example 5. The product was dissolved in a solution of 10 ml. of acetone and 1 ml. of water, and after cooling to 3–5°, 0.5 g. of N-bromoacetamide was added. The temperature was maintained at 3–5° during the addition, and for 1½ hours afterwards. Two grams of sodium sulfite were then added, the mixture treated with water and chloroform, and the organic layer washed with water. After drying over sodium sulfate, the organic phase was concentrated to a residue. The residue was acetylated with 1 ml. of acetic anhydride in 10 ml. of pyridine, allowed to stand overnight, and then poured into a mixture of ice and hydrochloric acid. There was obtained 875 mg. of the diacetate, M.P. 210–218°.

(b) Alternatively 1 g. of the 21-bromide of Example 6 was acetoxylated and acetylated as described in part (a) of this example to yield 830 mg. of the diacetate, M.P. 215–223°.

EXAMPLE 8

4-Bromopregnan-11α,17α,21-triol-3,20-dione 11,21-diacetate

A mixture of 2 g. of the diacetate obtained in Example 7 in 10 ml. of methylene chloride previously saturated with HBr and 10 ml. of t-butanol was cooled to 0°. At this temperature, a solution of 760 mg. of bromine in 10 ml. of methylene chloride and 10 ml. of t-butanol was added in 10 minutes. The solution was allowed to warm up to room temperature in order to discharge the residual bromine, and then concentrated under reduced pressure until solids appeared. Water was then added and the crude 4-bromide was removed by filtration, dried and crystallized from aqueous acetone to give 2.03 g. (85%), M.P. 197–202° dec. An analytical sample, crystallized once again from aqueous acetone, had a M.P. of 201–202° dec., $[\alpha]_D$ +62.9° (1% in acetone).

EXAMPLE 9

Δ⁴-pregnen-11α,17α,21-triol-3,20-dione 11,21-diacetate

A solution of 0.42 g. of semicarbazide hydrochloride and 0.3 g. of sodium acetate in 3.5 ml. of water and 15 ml. of acetic acid was added quickly to a suspension of 1.58 g. of the 4-bromide of Example 8 in 60 ml. of acetic acid while stirring and maintaining a gentle stream of carbon dioxide. After 15 minutes, 3.6 ml. of 1 N sodium acetate in acetic acid were added and the stirring continued for 10 minutes longer. The gas stream was then discontinued, and the solution refluxed for 10 minutes. After cooling, water was added and the mixture extracted with methylene chloride. The organic layer was washed with water, dried over magnesium sulfate and concentrated to a residue. The residue was crystallized from acetone-hexane: first crop, 670 mg., M.P. 218–223° dec.; second crop 300 mg., M.P. 214–219° dec. An analytical sample, chromatographed on Florisil and crystallized from acetone-hexane, had a M.P. of 221.2–223.0° dec., $[\alpha]_D$ +116.5 (1% in dioxane), $$\epsilon_{240}^{alc} \ 16,800$$

Analysis.—Calc'd for $C_{25}H_{34}O_7$: C, 67.24; H, 7.68. Found: C, 67.12; H, 7.85.

EXAMPLE 10

Δ⁴-pregnen-11α,17α,21-triol-3,20-dione

A solution of 1 g. of Δ⁴-pregnen-11α,17α,21-triol-3,20-dione 11,21-diacetate (from Example 9), in 15 ml. of methanol containing 0.5 g. of sodium bicarbonate in 5 ml. of water was refluxed for one hour. The mixture was cooled and diluted with water. After filtering, there was obtained Δ⁴-pregnen-11α,17α,21-triol-3,20-dione.

EXAMPLE 11

Δ⁴-pregnen-11α,17α,21-triol-3,20-dione 21-acetate

A solution of 1 g. of the dione obtained in Example 10, in pyridine, containing one equivalent of acetic anhydride, was allowed to stand overnight at room temperature. After pouring onto ice and hydrochloric acid, the precipitated solid was collected by filtration. Recrystallization from aqueous acetone yielded Δ⁴-pregnen-11α,17α,21-triol-3,20-dione 21-acetate.

EXAMPLE 12

Pregnan-11α,17α-diol-3,20-dione

A solution of 1 g. of pregnan-3α,11α,17α-triol-20-one (obtained in Example 2) in 10 ml. of acetone and 5 ml. of water was cooled to 0°, and a solution of 1 g. of N-bromoacetamide in 5 ml. of water was added, maintaining the temperature below 5° during the addition. After two hours at 5°, the excess oxidizing agent was destroyed by the addition of 2 g. of sodium sulfite in 10 ml. of water. Further addition of water precipitated 920 mg. of pregnan-11α,17α-diol-3,20-dione, M.P. 192–195°. The analytical sample, crystallized from aqueous acetone, had a M.P. of 192.6–194.0°, $[\alpha]_D$ +21.3° (acetone).

Analysis.—Calc'd for $C_{21}H_{34}O_5$: C, 70.74; H, 8.78. Found: C, 70.95; H, 8.85.

EXAMPLE 13

4-bromopregnan-11α,17α,diol-3,20-dione

A solution of 1 g. of pregnan-11α,17α-diol-3,20-dione (from Example 12) in 5 ml. of methylene chloride saturated with HBr and 5 ml. of butanol was cooled to 0°. Maintaining this temperature, a solution of 475 mg. of bromine in 5 ml. of methylene chloride and 5 ml. of t-butanol was added in 5 minutes. The solution was allowed to attain room temperature in order to discharge the residual bromine, and then concentrated under reduced pressure until solids appeared. Water was added, and the crude 4-bromide was removed by filtration. Recrystallization from aqueous acetone yielded 0.75 g. of 4-bromopregnan-11α,17α-diol-3,20-dione.

EXAMPLE 14

Δ⁴-pregnen-11α,17α-diol-3,20-dione

One gram of 4-bromopregnan-11α,17α,-diol-3,20-dione was treated with semicarbazide hydrochloride and sodium acetate in aqueous acetic acid as described in Example 9, and split with pyruvic acid to yield Δ⁴-pregnen-11α,17α-diol-3,20-dione. Acetylation with acetic anhydride in pyridine yielded the 11-acetate.

EXAMPLE 15

Δ⁴-pregnen-11α,21-diol-3,20-dione 21-acetate

A solution of 5 g. of the 3,20-bis-ethylene glycol ketal of pregnan-21-ol-3,11,20-trione (co-pending application of Eugene P. Oliveto and Temple Clayton, Serial No. 291,781, filed June 4, 1952, now abandoned), in 100 ml. n-propyl alcohol was reduced by means of 20 g. of sodium added over a period of two hours. Concentration and addition of water yielded the crude 3,20-bis-ethylene glycol ketal of pregnan-11α,21-diol-3,20-dione. This was not further purified, but was hydrolyzed with aqueous methanol and hydrochloric acid to pregnan-11α,21-diol-3,20-dione. Reaction with one equivalent of acetic anhydride in pyridine gave pregnan-11α,21-diol-3,20-dione 21-acetate, which was brominated in either acetic acid or methylene chloride-t-butanol to yield the corresponding 4-bromide. Dehydrobromination with semicarbazide or dinitrophenyl hydrazine yielded Δ⁴-pregnen-11α,21-diol-3,20-dione 21-acetate which upon acetylation with acetic anhydride and pyridine gave the 11,21-diacetate.

Although we have specifically described the formation only of the acetates and the hydroxylated compounds disclosed above, such acetates being generally the preferred esters, the esters of other acids can be readily prepared in an analogous manner by employing the corresponding anhydrates or acyl chloride, or their metal salts, such as the sodium salts, or other known reagents for acylation or acyloxylation. Thus the propionic, butyric, valeric, succinic, tartaric, maleic, benzoic, veratric, and other esters and polyesters of the above disclosed hydroxy compounds, can be obtained in the manner above described. The hydroxyl groups can also be converted into ether groups in known manner, particularly the methoxy and ethoxy groups.

The therapeutically active compounds of the present invention have, in many instances, the hormonal activity of the cortical steroids and can be administered in the manner and in the dosages common for such steroids.

We claim:

1. In a process for the manufacture of pregnan-11α,17α,21-triol-3,20-diones and their esters, the steps which comprise reacting a pregnan-3α,11α,17α-triol-20-one with bromine to form the corresponding 21-bromo compound, selectively oxidizing the 3-hydroxyl group to a keto group by reacting the 21-bromo compound with an aliphatic N-bromoacylamide, and replacing the 21-bromo group with a member of the class consisting of hydroxyl and acyloxy groups of lower alkanoic acids.

2. Process according to claim 1, wherein the selective oxidation is effected with N-bromacetamide.

3. In a process for the manufacture of the 21-lower alkanoyl esters of pregnan-11α,17α,21-triol-3,20-diones, the steps which comprise reacting a 21-bromopregnan-3α,11α,17α-triol-20-one with a lower alkanoylating agent to form the 21-ester and reacting the latter with N-bromacetamide to introduce a keto group in the 3-position.

4. Process according to claim 3, including the step of reacting the 3,20-dione with an acylating agent derived from a lower alkanoic acid to form the 11,21-diacyloxy derivative of pregnan-11α,17α,21-triol-3,20-dione.

5. Process for the manufacture of pregnan-11α,17α-diol-3,20-dione, which comprises reacting pregnan-3α,11α,17α-triol-20-one with an aliphatic N-bromoacylamide.

6. In a process for the manufacture of Δ⁴-pregnen-11α,17α-diol-3,20-diones, the steps which comprise selectively oxidizing the 3-hydroxyl of pregnan-3α,11α,17α-triol-20-one by reacting the latter with an aliphatic N-bromoacylamide to replace the same with a keto group, reacting the 3,20-dione so formed with bromine to introduce bromine at the 4-carbon, and dehydrohalogenating the bromide to introduce a double bond at $C_{4,5}$.

References Cited in the file of this patent

UNITED STATES PATENTS

| | | |
|---|---|---|
| 2,312,481 | Reichstein | Mar. 2, 1943 |
| 2,359,772 | Marker | Oct. 10, 1944 |
| 2,401,775 | Reichstein | June 11, 1946 |
| 2,409,043 | Inhoffen | Oct. 8, 1946 |
| 2,602,769 | Murray et al. | July 8, 1952 |
| 2,691,029 | Hanze et al. | Oct. 5, 1954 |

OTHER REFERENCES

Von Euw et al.: Helv. Chim. Acta, vol. 27, pages 1287–96 (1944) (abstracted in C.A. 39:3295, 8).

Fieser and Fieser: "Natural Products Related to Phenanthrene," pages 408–410 (1949), third edition.